Patented Dec. 26, 1944

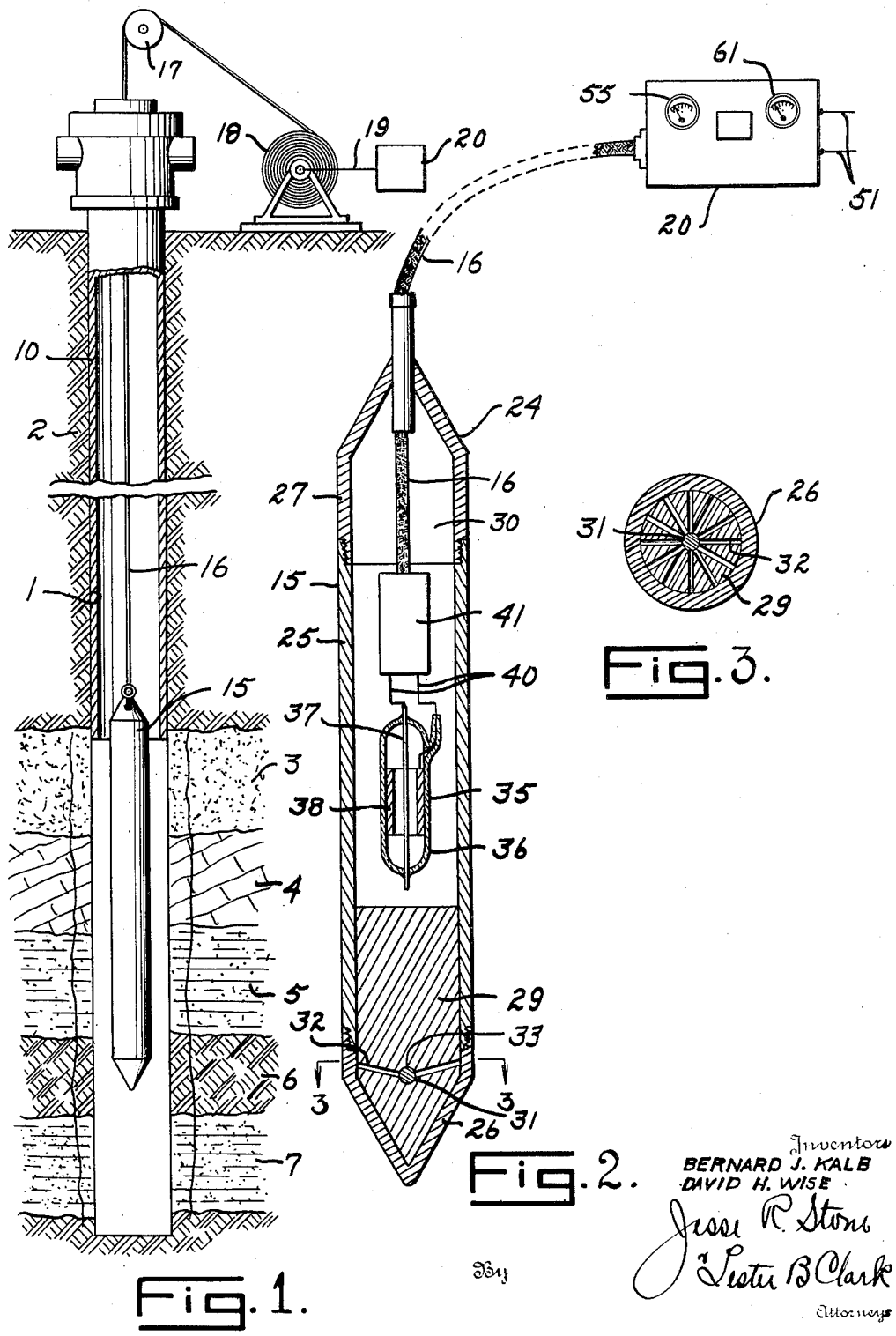

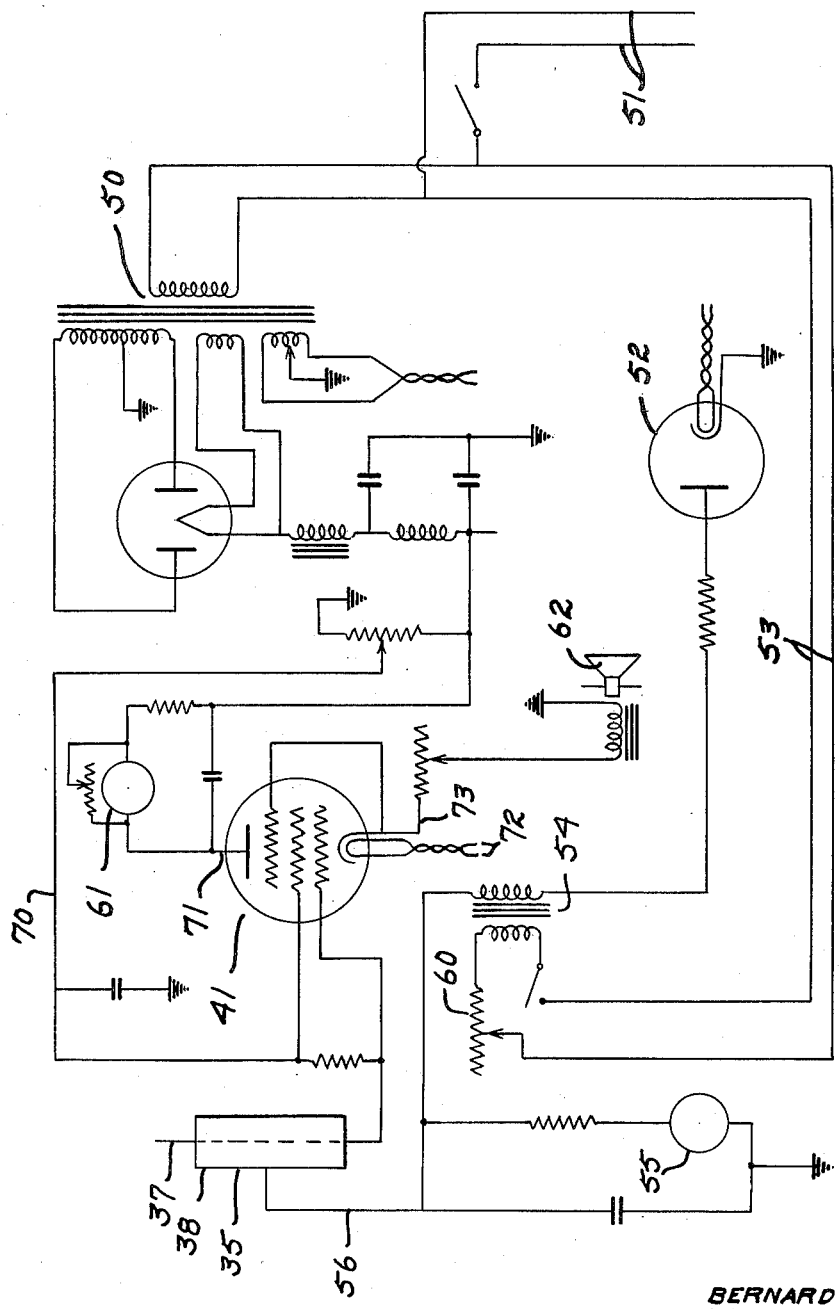

2,365,763

UNITED STATES PATENT OFFICE 2,365,763

WELL LOGGING DEVICE

Bernard J. Kalb and David H. Wise, Houston, Tex.; said Wise assignor to said Kalb Refiled for abandoned application Serial No. 238,924, November 4, 1938. This application November 10, 1941, Serial No. 418,621

3 Claims. (Cl. 250—83.6)

The invention relates to means and method for determining the nature and extent of strata penetrated by a bore hole.

This application is a refiling of our prior copending application, Serial No. 238,924, filed November 4, 1938.

It is a general object of the invention to obtain geological information by subjecting the strata in the bore hole to radioactive emanations and to determine the secondary effect produced thereby.

It is also an object to subject superposed strata about a bore hole to radioactive emanations and to determine at a point the amount of radiant energy transmitted to such point by the secondary radiations produced.

Another object is to subject strata in a bore hole to short radioactive emanations, such as gamma-rays, and to measure the variations in the secondary radiations produced thereby in successive strata.

Still another object is to progressively subject strata in a bore hole to radioactive emanations and to determine the nature and extent of the strata by measuring the relative ionization effects produced by secondary radiations from such strata.

It is also an object to provide a device which will set up radiations in formations surrounding a bore hole, such device also being provided with means for measuring secondary radiations from the formations.

Still another object is to provide a device which will detect oil bearing sands penetrated by a bore hole whether or not such bore hole be provided with a casing, concrete or both.

Still another object is to provide a device to be lowered into a well bore for progressively subjecting strata about the bore hole to radioactive emanations from a body of radium, or other radioactive substance, carried thereby and to also detect secondary radiations set up thereby by a detector also carried by such device in spaced relation and shielded from the radium so that the intensity and variation of the secondary radiations may be indicated or recorded at the mouth of the well bore as an indication of the radioactive characteristics, nature, and extent of the respective strata.

Still another object is to provide a source of radioactive emanations and a detector of radiant energy, a shield being provided to prevent a direct effect upon the latter by the former.

Other objects together with foregoing will be apparent from the following description taken in connection with the drawings in which:

Fig. 1 is a vertical section through a well bore illustrating the device of the invention and the manner of using such device.

Fig. 2 is a vertical section of the exploring unit and showing the manner of connecting such unit to suitable indicating or recording means.

Fig. 3 is a sectional view taken on line 3—3 in Fig. 2.

Fig. 4 is a wiring diagram of the mechanism used for measuring secondary radiations.

In Fig. 1 of the drawings the well bore 1 is shown as traversing the overburden 2 and successive superposed strata 3, 4, 5, 6 and 7 of sand, shale, water sand, rock and oil sand respectively. The upper portion of the bore is shown as provided with a casing 10 although it is to be understood that the entire length of the bore hole may be cased and the survey conducted inside of such casing or drill stem without departing from the scope of the invention. Likewise concrete may surround the bore hole either alone or in combination with the casing 10.

The exploring unit generally designated as 15 is attached to a conductor cable 16 which passes over the sheave 17 to the drum 18 suitably mounted near the mouth of the bore hole. The cable 16 is connected through suitable slip rings at the drum 18 to a cable 19 and thence to the indicating instrument 20.

With the construction thus generally described, it is believed apparent that the exploring unit 15 may be moved within the well bore and that current may be conducted between such unit and the indicating instrument 20 through the conductor cable 16. It is also apparent that with this construction the length of cable between the exploring unit 15 and the indicating instrument 20 remains constant and there is therefore little or no modification of results from change in level of the unit 15 within the bore hole.

The exploring unit 15 is shown in greater detail in Fig. 2 as comprising a container 24 made up of a central tubular section 25 which is closed at its opposite ends by means of caps 26, and 27 threadably attached thereto. The cable 16 passes through the cap 27 at its upper end and in sealing engagement therewith so as to exclude liquids within the bore hole from the chamber 30 within the unit. The tubular section 25 may be of steel but is preferably made of material such as brass or an aluminum alloy which is less opaque to secondary radiations which must pass therethrough in order to obtain desired information as to the strata traversed while the unit is moved within a well bore.

The lower portion of the chamber 30 carries a plug 29 which has a central chamber 31 therein. The plug 29 is desirably of lead but may be of any other suitable material that is sufficiently opaque to radioactive emanations as to shield the detecting means, hereafter described, from the radioactive substance used. A body of radium or other suitable radioactive substance 33 of any desired size may be deposited in the chamber 31 so that direct radiant energy will pass outwardly through openings 32 to the formations surrounding the unit. It will be noted that the passages 32 are inclined to direct the radiant energy and it seems obvious that such inclination will be such as to obtain the best resultant pick up of radiations. This plug also serves as a shield to prevent direct radiation of the radioactive emanations from the radioactive substance within the chamber 31 to the detector or pickup device mounted within the chamber 30 in the container 24 above the plug.

A detector or pickup device for the secondary radiations from the strata is disposed in the chamber 30 of the container 24 and is here illustrated as including an ionization chamber 35 illustrated as a conventional so-called Locher tube which comprises an outer envelope 36 having an axial central terminal 37 and a cylindrical terminal 38. These terminals are connected by means of conductors 40 to an amplifier unit 41 which is in turn connected through the cable 16 to the indicating instrument 20. It is thus apparent that the intensive direct radiations to the earth formations from the radium or other radioactive substance will be at once detected as secondary radiations from such formations by the ionization chamber 35.

The electrical circuits constituting a part of the invention are illustrated in Fig. 4. These circuits include a power pack construction generally designated as 50 and serving the purpose of providing proper direct current voltages from an alternating current source supplied through the input leads 51. Energy from the power pack 50 is supplied to the amplifier 41 which is in turn connected to the ionization chamber 35.

A rectifying tube 52 is also supplied with energy from the leads 51 through conductors 53 and transformer 54 to provide the necessary potential between the terminals 37 and 38 of the ionization chamber 35. A voltmeter 55 is connected between the high voltage lead 56 and ground in order to indicate the control necessary through the operation of rheostat 60 to provide the desired potential between the elements of the ionization chamber 35.

With suitable correlation of electrical constants in the circuit just described a quantum of radiant energy entering the ionization chamber 35 will cause an impulse of current to flow in the plate circuit of the amplifier 41. Such impulse will cause a sudden change in the reading of milliammeter 61. The rate at which this action takes place may be determined by observing the rate at which the indicating needle of the milliammeter 61 fluctuates. Alternately as is apparent, this rate may be determined aurally by means of the speaker 62 which is also connected to the amplifier 41.

Since a device such as the milliammeter 61, the speaker 62 or a mechanical counter possesses inertia, for maximum accuracy it is preferable to utilize a cathode ray tube to indicate the impulses produced in the amplifier circuit by the ionization which takes place by virtue of quanta of energy entering the ionization chamber 35. When a cathode ray tube is used for this purpose the number of impulses may be determined visually, but preferably photographically, and in this manner the change in rate as the exploring unit passes the various strata within the bore hole may be determined. It is believed apparent that two or more counter devices of the same type or of different types may be used so that results may be verified.

When the construction is used as shown in Fig. 2 the amplifier unit or element 41 is closely connected to the ionization chamber 35. This is a desirable arrangement of the respective elements as the impulses from the ionization chamber are relatively feeble. It is therefore more practical to conduct the output of the amplifier to the indicating instrument 20 at the surface. It is apparent that when the amplifier 41 and the ionization chamber 35 are to be closely interconnected and the resulting assembly is widely separated from the remainder of the apparatus, it is necessary that the conductors 70, 71, 72 and 73 pass upwardly through the conductor cable 16 to their respective elements within the instrument 20.

The invention contemplates positioning the amplifier 41 at whatever point may be deemed feasible in a given instance. It is therefore understood that the amplifier 41 may be desirably located either within the casing of the exploring unit 15 or at the surface and in direct connection with the elements of the unit 15 through the cable conductor 16. It is also to be understood that although the amplifier 41 is shown as comprising a single stage of amplification, such amplifier may comprise a plurality of stages in a manner well known in the art.

In the operation of the device the lower cap 26 of the exploring unit 15 is removed and a quantity of radioactive substance is placed within the chamber 31. The device is then reassembled by replacing the cap 26 preliminary to lowering the device in the well bore 1. It may be here noted that while various radioactive substances may be utilized when practicing the invention, yet the use of radium specifically is highly desirable as such material radiates a relatively large quantity of energy in the form of ultra-short or gamma radiations which are extremely penetrating and which therefore give rise to pronounced results.

Attention is also directed to the fact that various substances are known to set up secondary radiations when exposed to the bombardment of energy from a primary source of radiant energy. These secondary radiations travel in all directions from the secondary source and in the use of the device above described a portion of the secondary radiations will pass through the casing of the exploring unit 15 and will enter the ionization chamber 35. For each quantum of energy entering the ionization chamber 35 there will be a fluctuation of the milliammeter 61 or an indication will be produced upon any device used for indicating this fluctuation. Accordingly by measuring such fluctuations with time it is possible to determine the rate of change in the quanta of energy entering the ionizatioin chamber 35 and such change is indicative of the changing nature of formations through which the exploring unit 15 passes.

In order to obtain highly accurate date of the intensity of the secondary radiations and the variations thereof, certain corrections are necessary. Cosmic radiations are ever present and while the intensity of such radiations are substantially constant, such radiations should be taken into account. Likewise purely local conditions of radiant energy should be considered.

A more important correction factor arises from the fact that certain earth formations are themselves radioactive. The magnitude of such correction may be ascertained by traversing the bore hole with the exploring unit 15 without a radioactive substance in the chamber 31. By this procedure the necessary correction at various depths is obtained.

Broadly the invention contemplates means and method for logging a well bore by lowering therein a quantity of a radioactive substance which sets up secondary radiations in the surrounding formation and measuring the intensity of the secondary radiations as an indication of the nature of the formations through which such radioactive substance passes.

What is claimed is:

1. A device of the class described comprising a container, a conductor cable for supporting and moving the container within a bore hole and for conducting electric current between the container and the mouth of the bore hole, a source of radioactive emanations within the casing, a shield surrounding said source, said shield having outwardly directed passages to direct radiant energy into the formations surrounding the bore hole, an ionization chamber within the casing, and quanta measuring means at the mouth of the bore hole, said last mentioned means and the ionization chamber being connected to said conductor cable so that the quanta of energy entering the ionization chamber will be indicated by said means.

2. A device for determining differences in geological strata comprising a container, a cable for supporting and moving the container within a bore hole, a natural source of radioactive emanations within said container, a shield surrounding said source, said shield having passages therein to direct radiant energy outwardly through the container in predetermined directions, means in said container for detecting radiant energy entering the container from surrounding formations, and means connected to said last mentioned means for measuring the quanta of detected radiant energy.

3. In an apparatus for gamma-ray well logging, a container for the source of emanations including a body of lead or like material opaque to the radiant energy from such source, and a passage to direct the emanations from said source out through the body, said passage being inclined to direct the emanations in a predetermined upwardly and outwardly direction against the surrounding strata, and means shielded by said body from direct radiations from the source for directly detecting the secondary radiations created by the emanations passing through the inclined passage and bombarding the surrounding strata.

BERNARD J. KALB.
DAVID H. WISE.